May 16, 1967          K. HEHL          3,319,300
INJECTION MOLDING MACHINE FOR PRODUCING TWO-COLOR
OR TWO-MATERIAL MOLDED PRODUCTS

Filed May 4, 1964          3 Sheets-Sheet 1

Inventor:
Karl Hehl
By: Spencer & Kaye
Attorneys

Inventor:
Karl Hehl
By: Spencer & Kaye
Attorneys

3,319,300
Patented May 16, 1967

3,319,300
INJECTION MOLDING MACHINE FOR PRODUCING TWO-COLOR OR TWO-MATERIAL MOLDED PRODUCTS
Karl Hehl, Lossburg, Wurttemberg, Germany, assignor to Arburg Maschinenfabrik Hehl & Söhne, Lossburg, Wurttemberg, Germany
Filed May 4, 1964, Ser. No. 364,667
Claims priority, application Germany, Nov. 2, 1963, A 44,452
3 Claims. (Cl. 18—36)

The present invention relates generally to casting molds for an injection molding machine, and, more particularly, to the production of injection molded products of two colors or of two different materials.

It is a main object of the present invention to provide a casting mold of the character described wherein even a casting mold with small dimensions can provide for two-color injection molded articles having relatively large surface areas.

Another object of the instant invention is to provide a mold having an internal member aiding in forming the contour of the mold chamber and which is reversible and provides one side corresponding to the shape of one color component and the other side corresponding to the shape of the entire molded article.

These objects and others ancillary thereto are accomplished in accordance with preferred embodiments of the present invention wherein the casting mold is provided with two mold halves which are movable with respect to each other in the direction in which the casting mold opens. A suitable assembly is provided between the mold portions and it is movable within limits in the direction of the opening of the casting mold and has an axis of rotation which is disposed transversely to this direction of opening of the casting mold. This assembly is mounted to be rotatable about an axis of rotation and it includes two profiled or molding surfaces which are separated from each other. These mold profiles meet with oppositely located mold profiles when the casting mold is closed in order to form hollow mold cavities, one of which corresponds to the shape of one color component of the two colored injection molded articles, and the other of which corresponds to the shape of the entire two-color injection molded article.

The term "fitting surface" or "mold profile" refers to that surface of a portion of the casting mold which forms the hollow space or mold cavity together with an oppositely positioned surface of another portion of the casting mold when the mold is closed. The thermoplastic material can be injected into this hollow space. In a suitable manner the mold profiles of the rotatably mounted assembly are arranged diametrically with respect to one another, that is, on opposite sides of the assembly.

Additional objects and advantages of the present invention will become apparent upon consideration of the following description when taken in conjunction with the accompanying drawings in which.

The casting mold of the present invention is designed for use with an injection molding machine having two injection molding units. The mold allows for two color and/or two material injection molded articles. Typical examples of such multicomponent injection moldings are telephone dials, and keyboards for adding machines, in which symbols are made discernible by color contrast.

Figure 1:
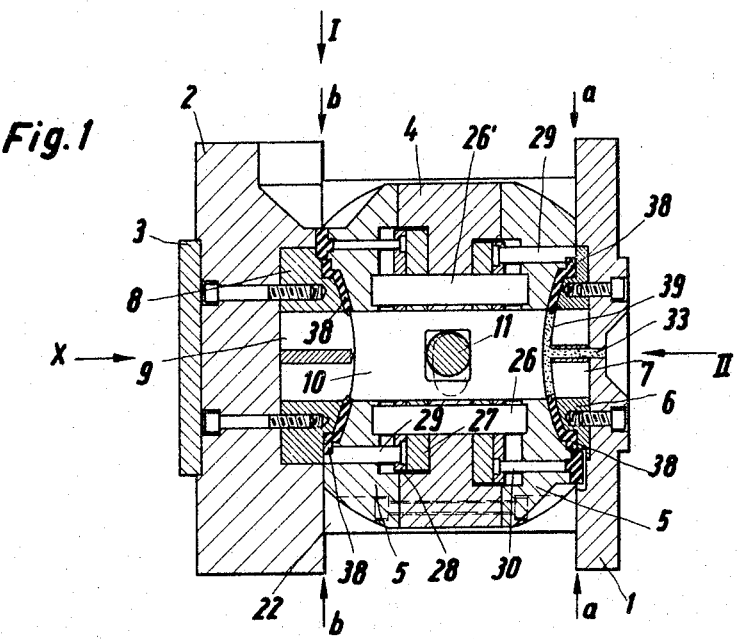
FIGURE 1 is a sectional view taken along the plane generally defined by reference line 1—1 of FIGURE 2 and showing the closed casting mold.
Figure 1A:
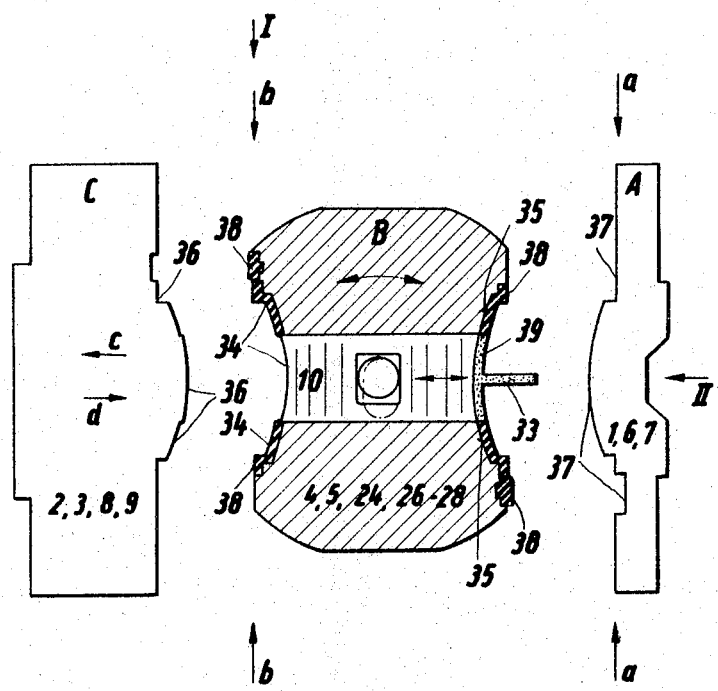
FIGURE 1a is a schematic view of the opened casting mold of FIGURE 1, prior to rotation of the inner assembly.

In FIGURES 1 and 1a the arrows a—a and b—b indicate the separating planes of the casting mold with arrows I and II indicating the directions in which injection takes place. It can be seen that by injection in direction I the mold cavity which provides the first color component of the two-color injection molded article to be produced is filled and this first portion comprising the first color component is made. From the injection direction II it can be seen that the second color component is molded onto the already present and previously made partial molding of the first component. The stationary mold part which includes elements 1, 6 and 7 and designated A in FIGURE 1a is the stationary portion of the casting mold and includes the mold clamping plate 1, a fitting surface element 6 fastened to the mold clamping plate, and a fitting die 7. An internal die assembly which includes elements 4, 5, 10, 24, and 26 through 28 and designated B in FIGURE 1 borders on the stationary injection mold portion A along the dividing plane a—a. This assembly includes a turnover plate 4, a fitting plate 5, displaceable and adjustable die or mold piece 10, locator pins 24, guide pins 26 and 26' and the ejector plates 27 and 28. This assembly or structural unit designated B in FIGURE 1a is rotatably mounted on an axle 11 which extends at right angles to the injection direction II. However, this axle itself is not rotatable.

A movable mold portion including elements 2, 3, 8 and 9 and designated C in FIGURE 1a borders on the rotatable unit B in the dividing plane b—b, and this movable mold portion is movable parallel to the injection direction II. This casting mold C includes a centering disc 3, a mold clamping plate 2, which is movable in the closing and opening directions, respectively, and a fitting die 9, as well as a fitting piece 8.

Figure 2:
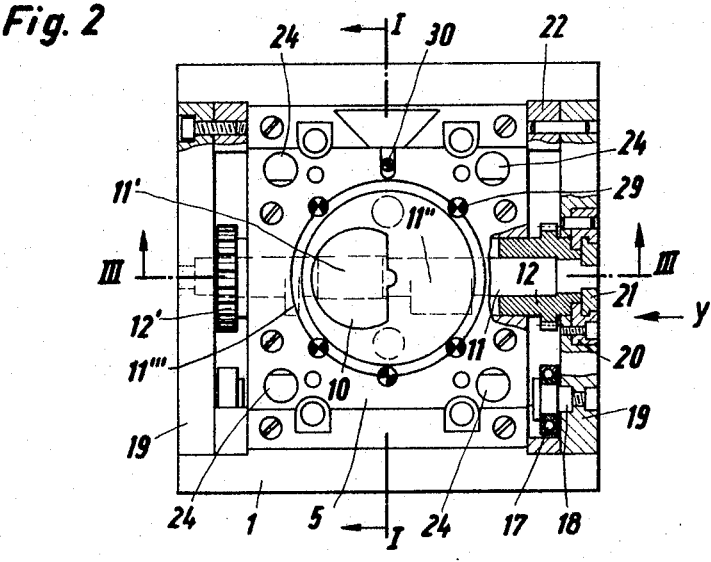
FIGURE 2 is a side elevational view of the structure of FIGURE 1 as seen in direction x after the movable mold portion has been removed, and with parts being shown in section for purposes of clarity.
Figure 3:
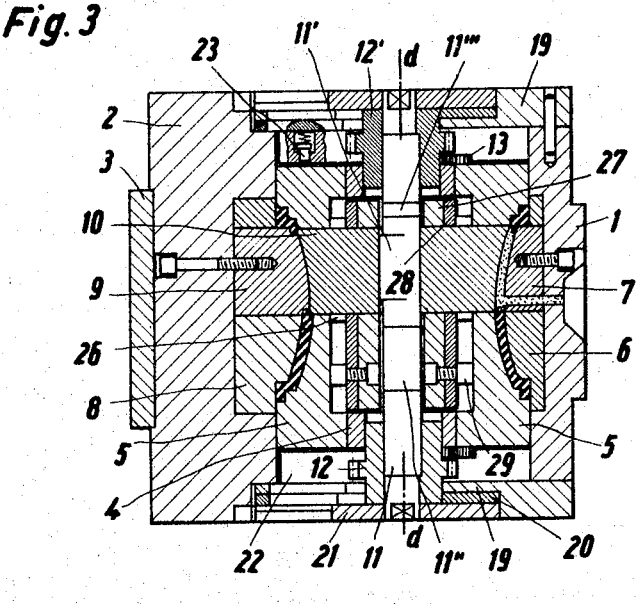
FIGURE 3 is a sectional view taken substantially along the plane defined by reference line 3—3 of FIGURE 2 and showing the movable casting mold section in place.
Figure 4:
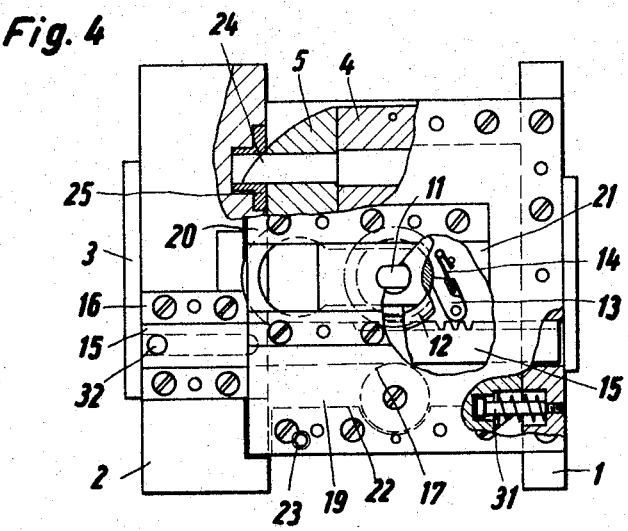
FIGURE 4 is an elevational view of a mold shown in FIGURE 2 viewed from direction y and with the movable casting mold portion in place.

As shown more clearly in FIGURE 2, the casting mold is encompassed on two opposite sides by supporting plates 19 provided at right angles to the stationary clamping plate 1 and are fastened to this clamping plate. In the center of each supporting plate 19 is an extended guide plate 20 in which a strip-like sliding plate 21 is mounted for sliding movement within limits and in the opening and closing direction, respectively, of the casting mold which is direction c—c in FIGURE 3. The free ends of axle 11 are engaged by these sliding plates 21. Since the supporting plates 19 are connected with the stationary casting mold portion A in a flush or sealing manner, the assembly B carried by the axle 11 and which is rotatable, is also, movable in the opening and closing direction of the casting mold and thus it can move away or toward the stationary casting mold portion A. A pinion 12 is rotatably mounted on each end of the non-rotatable axle 11 as shown in FIGURES 2 through 4. These pinions are coupled with the rotatable assembly by means of a lock pawl 13 and 14 which becomes effective only in one rotating direction of the pinions.

Guiding bars 16 are provided in the movable casting mold portion C. Gear racks 15 are mounted for guiding movement in these guiding bars so that they are, within certain limits, axially displaceable. As can be seen in FIGURES 2 and 4, grooved ball bearings 17 are provided in the supporting plates 19 at the height of pinions 12.

These ball bearings serve as counter bearings and as the guiding device for the gear racks 15 which are mesh with the pinions 12 and 12'. The grooved ball bearings are mounted on bearing pins 18 as shown in FIGURE 2. Each gear rack 15 is provided with a transverse or cross pin 32 as shown in FIGURE 4 in their portions thereof guided within the guide bars 16 as shown in FIGURE 4 wherein only one guide bar, one gear rack and the pinion 12 are visible. This transverse pin 32 is received in a longitudinal slot in the guide bar 16. The assembly B of the casting mold may thus move a distance corresponding to the length of these slots in the direction of opening or closing of the casting mold and during this movement the gear racks 15 will not be carried along. Only when the transverse pins 32 abut against the ends of the longitudinal slots of the guide bar 16 will the gear racks 15 be carried along with the movable casting mold portion C and rotate the pinions 12 and 12' and thus also rotate the assembly B.

Axle 11 is provided with three sections 11', 11", and 11''' each of which is constructed as an eccentric as shown in FIGURES 1, 2, and 3. The eccentrics of eccentric portions 11" and 11''' are displaced by 90° on the axle with respect to the eccentric or portion 11'. Eccentric portion 11' is disposed in the zone of a die or mold piece 10 which extends transversely through the rotatable assembly and is axially displaceable within this assembly within limits.

The other eccentric sections 11" and 11''' are effective upon ejector plates 27 and 28 which are mounted within the rotatable assembly so as to be displaceable within certain limits. The eccentric portions 11" and 11''' control these ejector plates 27 and 28 at certain times, and these ejector plates in turn eject the finished two-color molded article and/or the molding portion pertaining thereto by means of ejector pins 29 and 30. The guide pins 26 and 26' guide these ejector plates 27 and 28 in their movement.

Four guide rods 24 shown in FIGURES 2 and 4 are provided diagonally in the casting mold and extend parallel to the opening and closing direction of the mold. They are anchored in the rotatable assembly B and their purpose is to center and fix the rotatable assembly B when the casting mold is closed as shown in FIGURE 4. The centering or locator ends of these guide rods 24 which protrude from the assembly B are received in guide sleeves 25 of the movable clamping plate 2 as shown in FIGURE 4.

Four spring biassed bolts 31 are fixedly mounted in the stationary clamping plate 1, and in FIGURE 4 only one of these bolts is visible. These bolts are received in corresponding recesses in the rotatable assembly B when the casting mold is closed. When the mold is opened, they provide for a first mold separation in the separating plane a—a. The spacing between the stationary casting mold portion A and the rotatable assembly B which is caused by these spring bolts 31 is just sufficient to lift the central molded article 33, related to the second injection direction, out of its molding box. This lifting operation is needed for rotation of the rotatable assembly which takes place thereafter.

In the operation of the casting mold, when the casting mold is closed thermoplastic material is first injected thereinto from injection direction I and into the dividing plane b—b (FIGURE 1). This material represents one color component of the injection molded product. After this injection molding operation is finished, the casting mold is opened and the movable casting mold portion C is moved away from the stationary casting mold portion A. The casting mold assembly B which is rotatably mounted first follows the linear movement of movable casting mold portion C because it first abuts the casting mold portion C due to the effect of the spring bolts 31. However, with increasing distance between the casting mold assembly B and the stationary casting mold portion A, the spring bolts 31 lose their pretensioning. The casting mold thus first opens in the dividing plane a—a. Once the spring bolts 31 have lost their pretensioning, the casting mold also opens in the dividing plane b—b.

Upon displacement of the rotatable assembly B the sliding plates 21 moving in the guide plates 20 are carried along by the axle 11 in the opening direction of the casting mold. If the mold has been opened an amount as shown in FIGURE 1a, the transverse pins 32 of the gear racks 15 abut against the ends of the longitudinal slots of guide bar 16. Beginning with the time when this abutting takes place, the gear racks 15 are carried along by the movable casting mold portion C. The toothed portion of the gear racks mesh with the pinions 12, 12' and their direction of rotation is transmitted to the rotatably mounted assembly B by means of the lock pawl system 13, 14. This assembly is thus pivoted by 180° during the further opening movement of the casting mold portion C. During this pivoting movement, the die 10 of the rotatable assembly is axially displaced by the eccentric of section 11' by a distance which is sufficient for forming a mold cavity lying in the dividing plane a—a and being intended for the entire two-color injection molded product.

In the same manner the ejector plates 27 and 28 are displaced by the eccentrics of the eccentric sections 11" and 11''' and the ejector plates transmit their movement to the ejector pins 29 and 30 which then eject the finished two-color injection molded article designated 38, 39, in FIGURE 1a and which was produced in the preceding injection cycle. After the rotatable assembly has been pivoted by 180°, that is, at the maximum opening of the mold, the casting mold portion reverses its direction of movement by means of electrical control and the casting mold is again closed. During the course of the closing movement, the gear racks 15 return to their initial position and their toothed portions again mesh with pinions 12 and 12'. However, since now the direction of rotation of the pinions is different and the locking pawl system with this rotation direction removes the coupling between the pinions and the axle 11 by lifting the locking members 13 from their grooves, the pinions 12 and 12' rotate without carrying the assembly B along with them. After the mold is entirely closed, plastic material is simultaneously injected from injection direction I into the mold cavity lying in the dividing plane b—b for producing the first portion of the injected molded article, and also from the injection direction II into the mold cavity lying in the dividing plane a—a for producing the remainder of the two-component injection molded article onto the first partially molded article which had beeen previously produced and then placed into this plane by the preceding rotation of assembly B. After the end of the cooling period, the casting mold is opened completely and again the assembly is pivoted by 180° the die 10 of the assembly is displaced for correspondingly correcting the mold cavity dimensions and the finished two-color injection molded articles are ejected with the aid of ejector devices 29, 30.

The two injection units injecting from injection directions I and II are controlled synchronously. This means that the half-finished injection molded article 38 as shown in FIGURE 1a and the second component of the two-color injection molded article to be produced, are formed simultaneously. Consequently, each time the mold opens, a finished two-color injection molded article is ejected.

It will be understood that the above description of the present invention is susceptible to various modifications, changes, and adaptations, and the same are intended to be comprehended within the meaning and range of equivalents of the appended claims.

What is claimed is:
1. A casting mold for an injection molding machine for producing two-color or two-material injection molded products and having two mold portions which are movable with respect to each other in the opening direction of the casting mold, said mold comprising, in combination:
(a) a first mold portion;

(b) a second mold portion movable relatively toward and away from said first mold portion: and (c) a mold assembly disposed between said portions and which is displaceable within limits in the opening direction of the casting mold and mounted for rotation about an axis disposed transversely of the opening direction, said assembly having at least two mold profiles spaced from each other and disposed to meet with oppositely positioned mold profiles when the casting mold is closed to form mold cavities, one of which corresponds to the shape of one color component of the two-color injection molded product and the other one of which corresponds to the shape of the entire two-color injection molded product, said assembly including a mold piece mounted for limited displacement in the opening direction of the mold and which at least in part defines the mold profiles.

2. A casting mold for an injection molding machine for producing two-color or two-material injection molded products and having two mold portions which are movable with respect to each other in the opening direction of the casting mold, said mold comprising, in combination:

(a) a first mold portion;

(b) a second mold portion movable relatively toward and away from said first mold portion;

(c) a mold assembly disposed between said portions and which is displaceable within limits in the opening direction of the casting mold and mounted for rotation about an axis disposed transversely of the opening direction, said assembly having at least two mold profiles spaced from each other and disposed to meet with oppositely positioned mold profiles when the casting mold is closed to form mold cavities, one of which corresponds to the shape of one color component of the two-color injection molded product and the other one of which corresponds to the shape of the entire two-color injection molded product; and (d) a non-rotatable axle having at least one portion provided with an eccentric and on which said assembly is mounted, said assembly including a mold piece mounted for limited displacement in the opening direction of the mold and which at least in part defines the mold profiles.

3. A mold as defined in claim 2 wherein said mold piece has a bore through which the portion of the axle including said eccentric portion is disposed, the surface defining said bore being arranged to be engaged by the eccentric portion when the assembly rotates 180° to displace said mold piece in the opening direction of the casting mold.

References Cited by the Examiner

UNITED STATES PATENTS

| 2,226,408 | 12/1940 | Nast | 18—30 |
| 2,333,059 | 10/1943 | Tucker | 18—30 |
| 3,224,043 | 12/1965 | Lameris et al. | 18—30 |

WILLIAM J. STEPHENSON, *Primary Examiner.*

E. MAR, *Assistant Examiner.*